United States Patent
You et al.

(10) Patent No.: US 12,321,059 B2
(45) Date of Patent: Jun. 3, 2025

(54) DISPLAY PANEL WITH REDUCED REFLECTANCE

(71) Applicant: DELL PRODUCTS L.P., Round Rock, TX (US)

(72) Inventors: Jaehyun You, Singapore (SG); Guentaek Oh, Singapore (SG); Yonggu Kang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/350,338

(22) Filed: Jul. 11, 2023

(65) Prior Publication Data

US 2025/0020955 A1 Jan. 16, 2025

(51) Int. Cl.
*G02F 1/1335* (2006.01)

(52) U.S. Cl.
CPC .. *G02F 1/133512* (2013.01); *G02F 1/133519* (2021.01)

(58) Field of Classification Search
CPC ......... G02F 1/133512; G02F 1/133509; G02F 1/133528; G02F 1/133531; G02F 2001/136222; H01L 29/78633; H01L 51/5284; B29D 11/00644; B32B 2307/42; G02B 5/3025
See application file for complete search history.

(56) References Cited

U.S. PATENT DOCUMENTS

| | | | |
|---|---|---|---|
| 2014/0125931 A1* | 5/2014 | Niu | G02F 1/133514 430/7 |
| 2015/0015826 A1* | 1/2015 | Mizusaki | C09K 19/56 445/24 |
| 2015/0268521 A1* | 9/2015 | Daishi | H01L 27/1222 349/138 |
| 2019/0121475 A1* | 4/2019 | Park | H10K 59/38 |
| 2020/0041838 A1* | 2/2020 | Zha | H10D 86/441 |
| 2021/0382204 A1 | 12/2021 | Aurongzeb | |
| 2023/0011051 A1 | 1/2023 | Schwager et al. | |

* cited by examiner

*Primary Examiner* — Jonathan Y Jung
(74) *Attorney, Agent, or Firm* — Larson Newman, LLP

(57) ABSTRACT

A display for an information handling system includes a thin-film transistor (TFT) glass and a color filter layer. A black matrix layer is in physical communication with the TFT glass and with the color filter layer. The black matrix layer is disposed between the TFT glass and the color filter layer, and absorbs light that moves through the TFT glass.

18 Claims, 3 Drawing Sheets

DISPLAY PANEL WITH REDUCED REFLECTANCE

FIELD OF THE DISCLOSURE

The present disclosure generally relates to information handling systems, and more particularly relates to a display panel with a reduced amount of reflectance.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a thin-film transistor (TFT) glass and a color filter layer. A black matrix layer may be in physical communication with the TFT glass and with the color filter layer. The black matrix layer may be disposed between the TFT glass and the color filter layer, and may absorb light that moves through the TFT glass.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
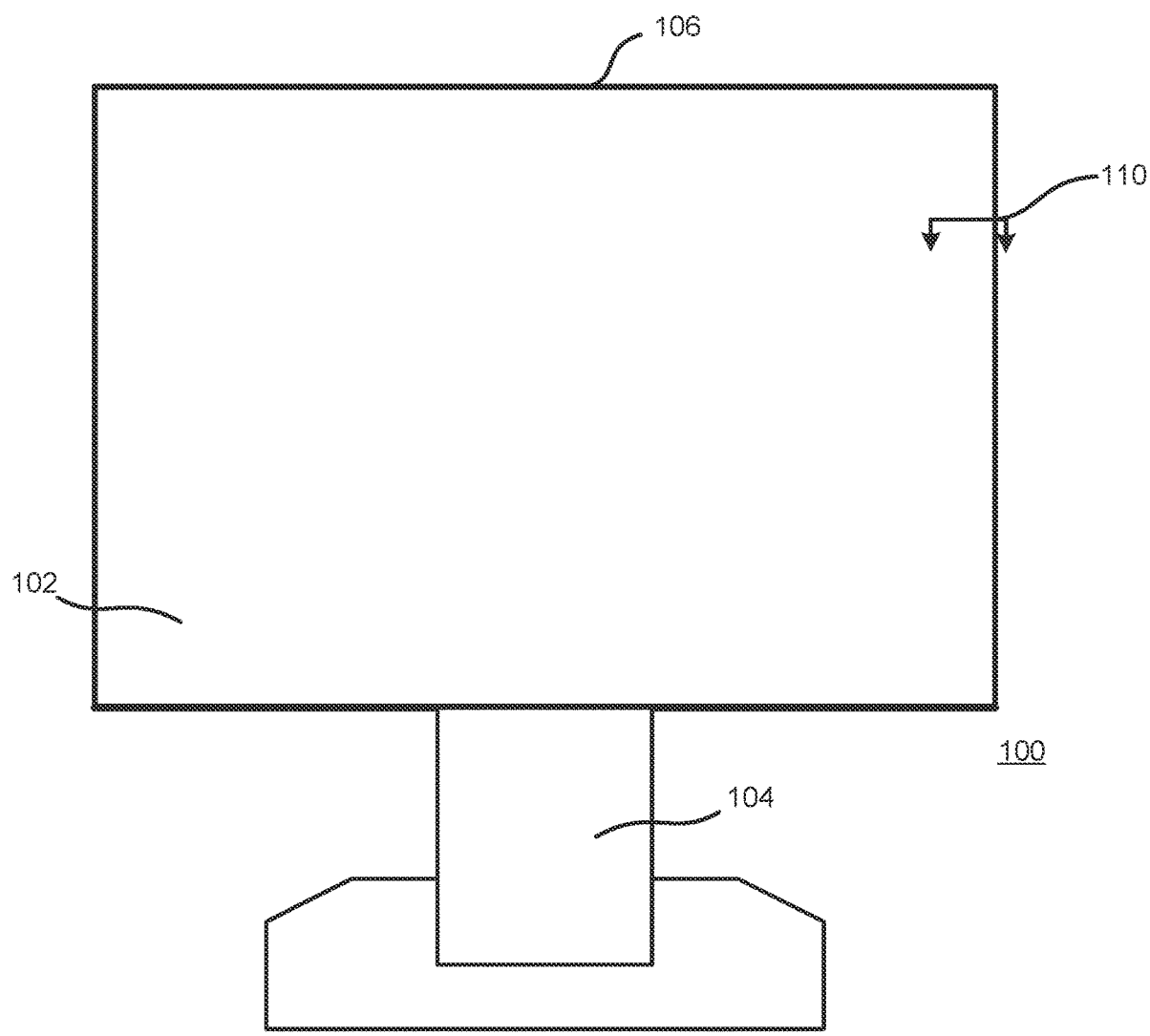
FIG. 1 is a diagram of a display device of an information handling system according to at least one embodiment of the present disclosure.

FIG. 1 is a diagram of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102, a stand 104, and a black matrix bezel area 106. In an example, black matrix bezel area 106 may surround front panel 102. In an example, matrix structure 106 may be located along both sides and the top of front panel 102 of display 100, and may provide a transition between the display screen the edge of the display. Matrix structure 106 may be a solid black color. In this manner, matrix structure 106 may be configured to provide a black transition between front panel 102 and the edge of display 100. In certain examples, front panel 102 may be an 4SNB display. In an example, thin-film transistor (TFT) glass portion of front panel 102 may be up or closer to the viewing surface of the front panel. A cross section of front panel 102 taken along line 110 in FIGS. 2 and 3 below.

Figure 2:
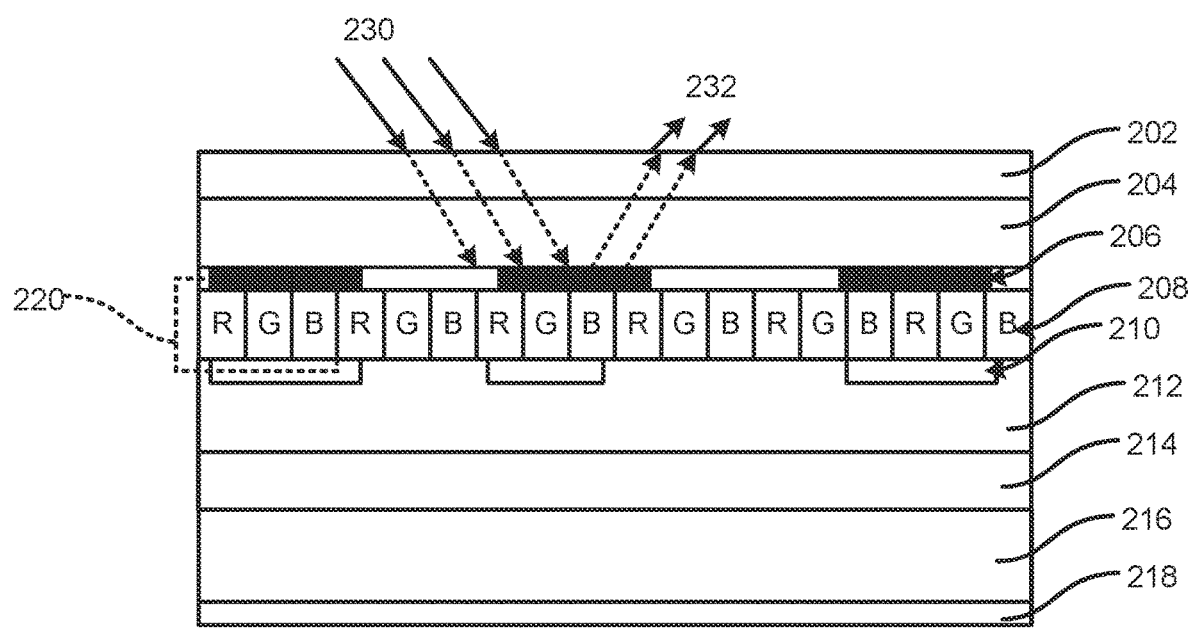
FIG. 2 is a diagram illustrating a cross section of a portion of a display panel of an information handling system according to at least one embodiment of the present disclosure.

FIG. 2 illustrates a cross section of a portion 200 of display 100 of FIG. 1 according to at least one embodiment of the present disclosure. Cross section 200 of display 100 illustrates a down polarizer 202, a TFT glass 204, a black matrix array 206, a color filter layer 208, a copper metal array 210, a liquid crystal layer 212, a transparent over coat layer 214, a color filter (CF) glass 216, and an upper polarizer 218. Color filter layer 208 includes multiple filters 220. In an example, each filter 220 includes red, green, and blue color filters, which in turn may be utilized to allow different amounts of light through each color filter to create different colors on front panel 102 of display 100 in FIG. 1. In certain examples, filters 220 provide an output image from the information handling system, such as information handling system 300 of FIG. 3.

As illustrated in FIG. 2, down polarizer 202 may be nearest layer to the surface of display 100 of FIG. 1. In this configuration, light waves may intersect the down polarizer in the direction of arrows 230. In an example, the light waves may enter display 100 through down polarizer 202 and TFT glass 204. In response to the light waves hitting black matrix structure 206, a substantial amount of the light waves may be absorbed by the black matrix structure. In this situation, an amount of light reflected, in the direction of arrows 232, from display 100 may be substantially less than the amount of light received at down polarizer 202. In previous displays, the copper metal layer may be in physical communication with the TFT glass 204, such that a large amount of the light received at the TFT glass 204 may be reflected from the display based on the high metal reflectance of the copper metal layer. Display 100 may be improved based on black matrix array 206 being in physical communication with TFT glass 204, which in turn may reduce a reflectance level of the display.

In an example, black matrix array or layer 206 may be in physical communication with color filter layer 208. In this example, black matrix array/layer 206 may be located between TFT glass 204 and color filter layer 208. In certain examples, copper metal array/layer 210 may be in physical communication with an opposite surface of color filter layer 208 as compared to black matrix array/layer 206. A bottom surface of color filter layer 208 may be substantially flat so that copper metal array/layer 210 may be placed flat within display 100. In an example, copper metal array/layer 210 may utilized to apply an electrical signal to the inside of a display panel. In this situation, copper metal array/layer 210 may apply an electrical application from the circuit to the inside of the panel.

Copper metal array 210 may be in physical communication with liquid crystal layer 212, which in turn may be in physical communication with transparent over coat 214. In this configuration, a first surface of liquid crystal layer 212 may be in physical communication with copper metal array 210 and a second surface of the liquid crystal layer may be in physical communication with a first surface of transparent over coat 214. A second surface of transparent over coat 214 may be in physical communication with CF glass 216. In an example, CF glass may be located between transparent over coat 214 and upper polarizer 218.

Figure 3:
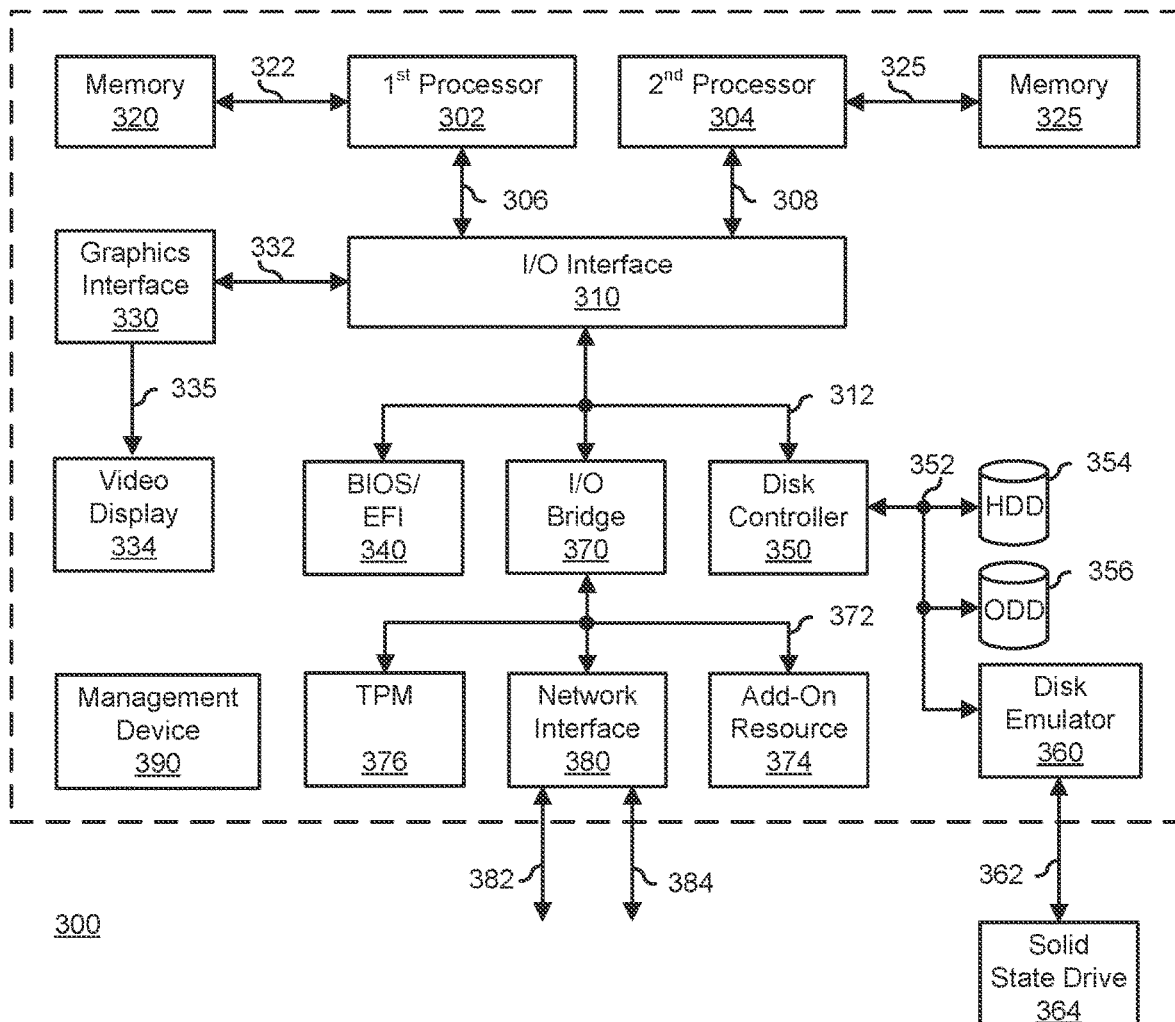
FIG. 3 is a block diagram of a general information handling system according to an embodiment of the present disclosure.

FIG. 3 shows a generalized embodiment of an information handling system 300 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 1695. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 4394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
  a thin-film transistor (TFT) glass;
  a color filter layer;
  a black matrix layer in physical communication with the TFT glass and with a first surface of the color filter layer, wherein the black matrix layer is disposed between the TFT glass and the color filter layer, and the black matrix layer absorbs light that moves through the TFT glass, wherein a first amount of light reflected through the TFT glass is less than a second amount of light received at the TFT glass; and
  a copper metal layer in physical communication with a second surface of the color filter layer that is opposite the black matrix layer, wherein the color filter is disposed between the black matrix layer and the copper metal layer.

2. The display of claim 1, further comprising a down polarizer in physical communication with the TFT glass, wherein the down polarizer is an outer most surface of the display.

3. The display of claim 1, wherein the second surface of the color filter layer is flat.

4. The display of claim 1, further comprising a liquid crystal layer in physical communication with the copper metal layer.

5. The display of claim 4, further comprising a transparent over coat layer in physical communication with the liquid crystal layer.

6. The display of claim 5, further comprising a color filter layer in physical communication with the transparent over coat layer.

7. The display of claim 1, wherein the color filter layer includes multiple filters, and each of the multiple filters includes red, green, and blue color filters.

8. The display of claim 7, wherein the red, green, and blue color filters allow different amounts of light through each color filter to create different colors on the display.

9. A display for an information handling system, the display comprising:
- a down polarizer located on a first surface of the display;
- a thin-film transistor (TFT) glass in physical communication with the down polarizer;
- a color filter layer;
- a black matrix layer in physical communication with the TFT glass and with a first surface of the color filter layer, wherein the black matrix layer is disposed between the TFT glass and the color filter layer, and the black matrix layer absorbs light received through the down polarizer, wherein a first amount of light reflected through the TFT glass is less than a second amount of light received at the down polarizer;
- a copper metal layer in physical communication with a second surface of the color filter layer that is opposite the black matrix layer, wherein the color filter is disposed between the black matrix layer and the copper metal layer; and
- an upper polarizer located on a second surface of the display, wherein the second surface of the display is an opposite side of the display as compared to the first surface of the display.

10. The display of claim 9, wherein the surface of the color filter layer in physical communication with the copper metal layer is flat.

11. The display of claim 9, further comprising a liquid crystal layer in physical communication with the copper metal layer.

12. The display of claim 11, further comprising a transparent over coat layer in physical communication with the liquid crystal layer.

13. The display of claim 9, wherein the color filter layer includes multiple filters, and each of the multiple filters includes red, green, and blue color filters.

14. The display of claim 13, wherein the red, green, and blue color filters allow different amounts of light through each color filter to create different colors on the display.

15. A display for an information handling system, the display comprising:
- a down polarizer located on a first surface of the display;
- a thin-film transistor (TFT) glass in physical communication with the down polarizer;
- a color filter layer;
- a black matrix layer in physical communication with the TFT glass and with a first surface of the color filter layer, wherein the black matrix layer is disposed between the TFT glass and the color filter layer, wherein the black matrix layer absorbs light received through the down polarizer, wherein a first amount of light reflected through the TFT glass is less than a second amount of light received at the down polarizer;
- a copper metal layer in physical communication with a second surface of the color filter layer that is opposite the black matrix layer, wherein the color filter is disposed between the black matrix layer and the copper metal layer;
- an upper polarizer located on a second surface of the display, wherein the second surface of the display is an opposite side of the display as compared to the first surface of the display; and
- a color filter glass in physical communication with the upper polarizer.

16. The display of claim 15, further comprising a liquid crystal layer in physical communication with the copper metal layer.

17. The display of claim 15, wherein the color filter layer includes multiple filters, and each of the multiple filters includes red, green, and blue color filters.

18. The display of claim 17, wherein the red, green, and blue color filters allow different amounts of light through each color filter to create different colors on the display.

* * * * *